United States Patent [19]

Ochoa

[11] 4,208,291
[45] Jun. 17, 1980

[54] APPARATUS FOR SEPARATING SOLIDS OF RELATIVELY LOW SPECIFIC GRAVITY FROM HEAVIER LIQUIDS

[75] Inventor: Dominique Ochoa, Trujillo Alto, P.R.

[73] Assignee: KFC San Juan, Inc., San Juan, P.R.

[21] Appl. No.: 44,395

[22] Filed: May 31, 1979

[51] Int. Cl.² ............................................. B01D 21/10
[52] U.S. Cl. .................................. 210/522; 210/525; 210/532 R; 210/540
[58] Field of Search ................. 210/83, 252, 295, 297, 210/298, 305, 513, 521, 522, 523, 525, 532 R, 533–538, 540

[56] References Cited

U.S. PATENT DOCUMENTS

| | | | |
|---|---|---|---|
| 549,967 | 11/1895 | Jacoby | 210/538 |
| 3,460,677 | 8/1969 | Fifer | 210/521 |
| 3,826,740 | 7/1974 | Jewett | 210/521 |

*Primary Examiner*—Frank Sever
*Attorney, Agent, or Firm*—Kane, Dalsimer, Kane, Sullivan and Kurucz

[57] ABSTRACT

Disclosure is made of apparatus for the separation of solids having relatively low specific gravities from heavier liquids, such as water. The apparatus comprises a multiplicity of separate chambers, through which mixtures of the solids or their liquified forms with the water are passed. The passage is a tortuous route designed to solidify liquid forms of the solids and to effect separation according to specific gravities.

1 Claim, 8 Drawing Figures

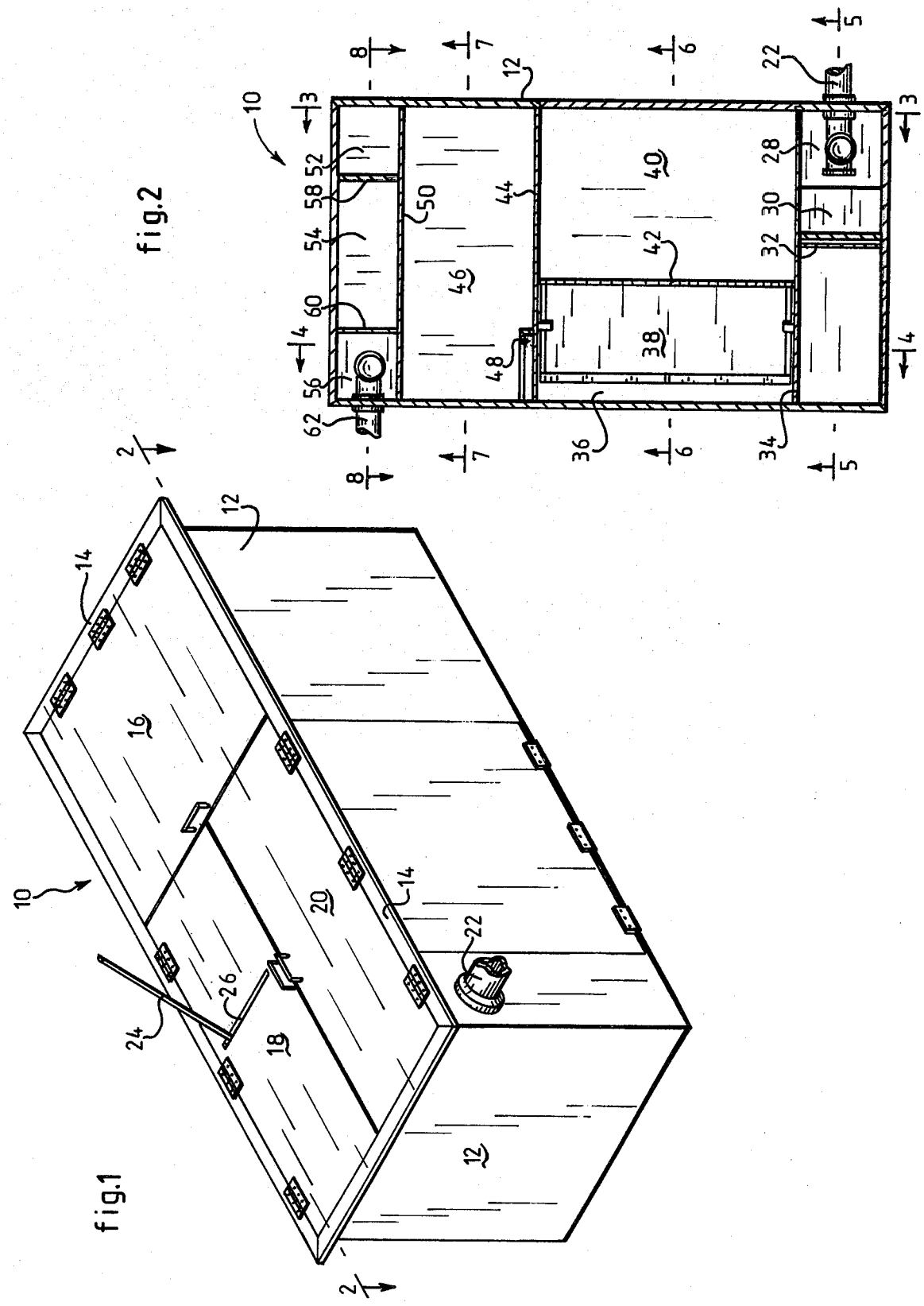

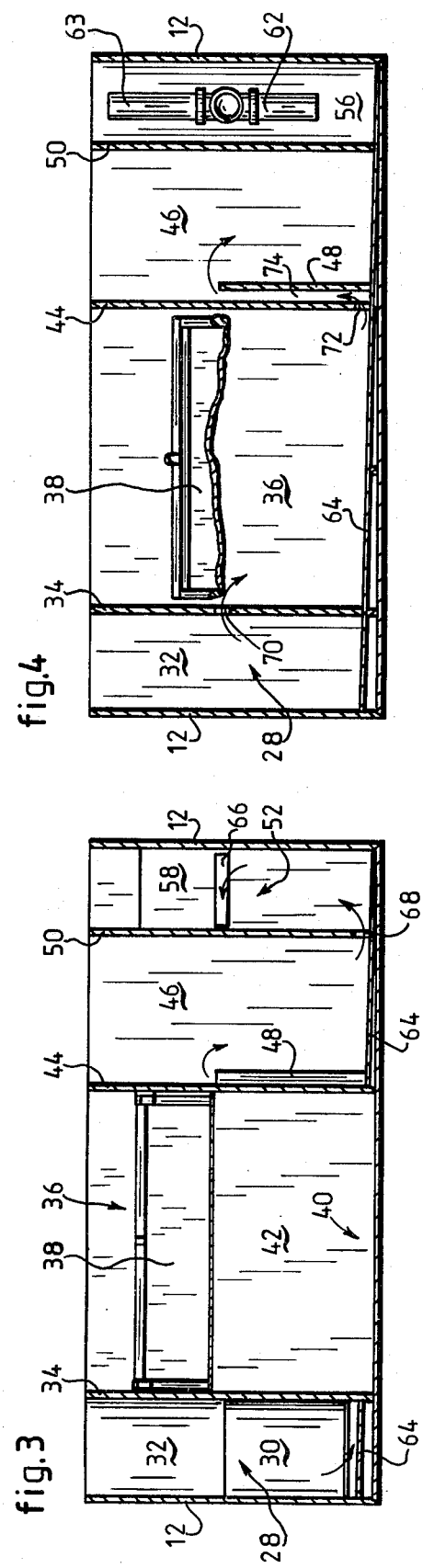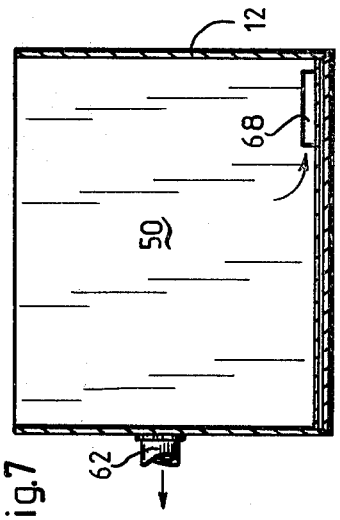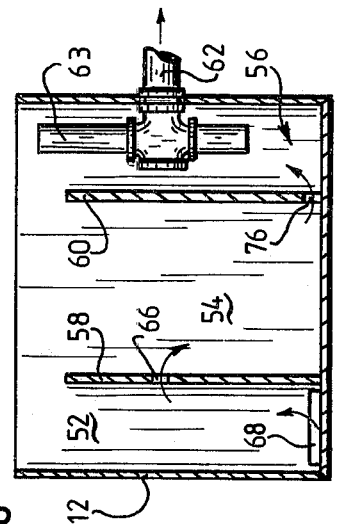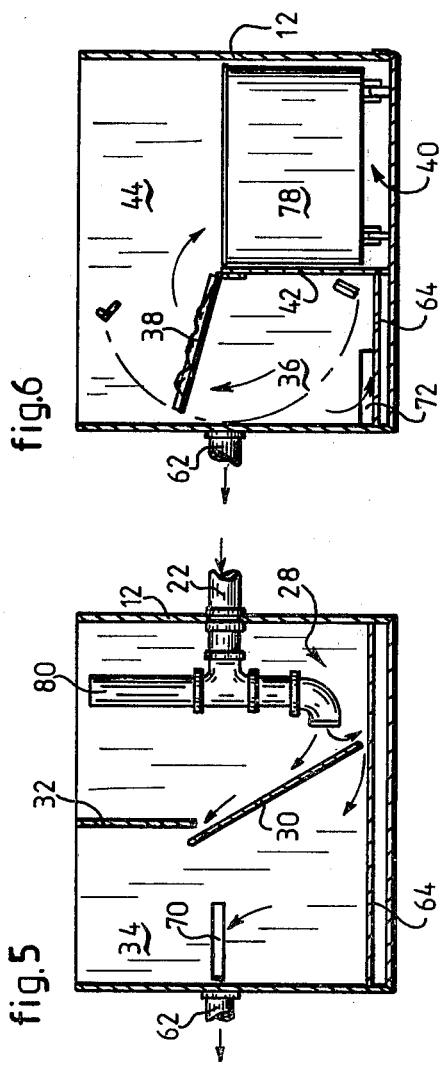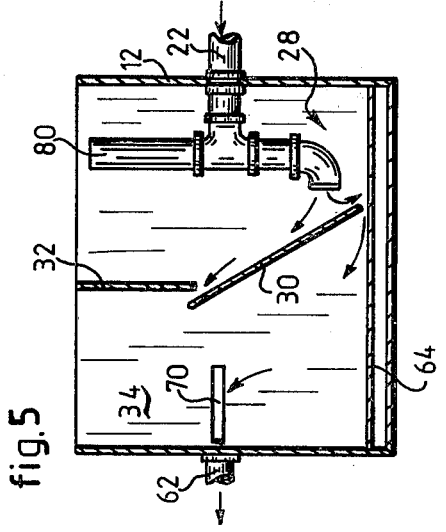

APPARATUS FOR SEPARATING SOLIDS OF RELATIVELY LOW SPECIFIC GRAVITY FROM HEAVIER LIQUIDS

BACKGROUND OF THE INVENTION

1. Field of the Invention

The invention relates to apparatus for the separation of solids having relatively low specific gravities from heavier liquids, such as water. More specifically the invention relates to the separation of solid fats, grease and the like from mixtures with water.

2. Brief Description of the Prior Art

The prior art is replete with descriptions of apparatus for separating solids having relatively low specific gravities from water; see for example the descriptions in U.S. Pat. Nos. 305,981; 549,967; 617,057; 1,672,583; 1,889,601; 2,284,737; and 2,393,498. In general, the prior art apparatus has not been entirely satisfactory in all respects. For example, the solids may clog water passages in the apparatus or be incompletely separated from the water. Often the apparatus will be rendered ineffective by accumulations of solid materials in the apparatus. This may necessitate a shutdown of the apparatus for cleaning and removal of the accumulations.

The apparatus of the present invention is particularly advantageous for its efficiency in separating large volumes of grease, fats and the like from aqueous mixtures, in a continuous process. Physical removal of the solid accumulations may be effected without interruption of the separating process. There is less likelihood of accumulated solids blocking the efficient operation of the apparatus of the invention.

SUMMARY OF THE INVENTION

The invention comprises apparatus for separating relatively light solids from heavier liquids, which comprises:

an enclosure, open at the top;

first partition means within said enclosure for defining a first chamber therein;

a first conduit through the enclosure having a first open end outside of the enclosure and a second open end adjacent the bottom of the chamber, said conduit being a means of delivering mixtures of the heavy liquids with said solids and liquified forms of said solids, to the apparatus;

baffle means adjacent the second open end of the conduit, for directing the flow of said mixtures upward in the chamber;

second partition means within said enclosure for defining at least in part a second chamber within said enclosure;

a portal in the upper part of the first partition means, opening between the top of the first chamber and the top of the second chamber;

third partition means within the enclosure which with said second partition means define a third chamber within the enclosure and alone defines at least in part a fourth chamber;

second conduit means having a first open end in the bottom of the second chamber and a second open end in the top of the third chamber;

fourth partition means dividing the fourth chamber into first and second zones;

a portal in the bottom of the third partition means, opening between the bottom of the third chamber and the bottom of the first zone of the fourth chamber;

fifth partition means dividing the second zone into said second zone and a third zone;

a portal in the upper part of the fourth partition means opening between the first and second zones;

a portal in the bottom of the fifth partition means opening between the second and third zones;

outlet means in the upper portion of the third zone opening to the outside of the enclosure;

means of covering the open top of the enclosure;

means in the means of covering, for access to the first, second, third and fourth chambers; and means for skimming solids from said mixtures in the second chamber, which comprise a strainer pivotably mounted at one end on a wall of the second chamber and free to pivot about its mounting so the opposite end thereof may travel in an arc from the lower end of the second chamber to above said second chamber at an angle permitting skimmed solids to fall by gravity toward the mounted end.

In a preferred embodiment of the invention, skimmed solids may be deposited in a fifth chamber interiorly of the enclosure.

BRIEF DESCRIPTION OF THE DRAWINGS

FIG. 1 is an isometric view of an embodiment apparatus of the invention.

FIG. 2 is a view along lines of 2—2 of FIG. 1.

FIG. 3 is a view along lines 3—3 of FIG. 2.

FIG. 4 is a view along lines 4—4 of FIG. 2.

FIG. 5 is a view along lines 5—5 of FIG. 2.

FIG. 6 is a view along lines 6—6 of FIG. 2.

FIG. 7 is a view along lines 7—7 of FIG. 2

FIG. 8 is a view along lines 8—8 of FIG. 2.

DETAILED DESCRIPTION OF THE PREFERRED EMBODIMENT OF THE INVENTION

The following description of the preferred embodiments of the invention is to be read in conjunction with the accompanying drawings of FIGS. 1-8, inclusive.

Referring first to FIG. 1, there is seen an isometric view of the outside of an embodiment apparatus of the invention. The apparatus 10 comprises an enclosure 12 which is generally rectangular in shape and open at the top 14. Closing the top 14 are a series of hingedly mounted access doors 16, 18, 20. The access doors 16, 18 20 are also provided with a means (handles) for opening the doors 16, 18, 20 for access to the chamber and/or chambers within enclosure 12 and beneath the appropriate access door 16, 18 or 20. Viewable in FIG. 1 is an inlet conduit 22 at the upper end of enclosure 12. A skimmer handle 24 is seen to protrude through slot 26 in the access door 18. The function of skimmer handle 24 will be described move fully hereinafter.

Referring now to FIG. 2, a view along lines 2—2 of FIG. 1 an overhead view of the interior of enclosure 12 may be observed. It will be seen that the interior of enclosure 12 may be observed. It will be seen that the interior of enclosure 12 is divided into a plurality of chambers by partition means. The chamber 28 is an initial chamber for receiving liquid mixtures of relatively light solids, liquified forms thereof and relatively heavy liquids deposited in chamber 28 from conduit 22 piercing the enclosure 12. Baffle plates 30, 32 are positioned within chamber 28. The function of baffle plates 30, 32 will be described more fully hereinafter. Partition 34 separates the chamber 28 from secondary chamber 36 wherein there is located a skimmer device 38. A portion of the wall or partition 34 also separates chamber 28 from a chamber 40 positioned adjacent to chamber 36 and separated therefrom by partition 42. An additional partition 44 serves to separate chambers 36 and 40 from a tertiary chamber 46. Duct walls 48 within chamber 46 form with a portion of partition 44 a conduit means within the enclosure 12, the purpose of which will be discussed more fully hereinafter. Forming the distal boundary of chamber 46 is another partition 50 which also serves to define further chambers 52, 54 and 56. The chambers 52 and 56 are set apart from chamber 54 by the partitions 58 and 60. Also piercing the enclosure wall 12 is an exit conduit 62 which communicates freely from outside of the apparatus 10 to the final chamber 56.

FIG. 3 is a view of the apparatus 10 as seen along lines 3—3 of FIG. 2. Further details of the construction of apparatus 10 may be observed in this view. Note for example that the duct 48 extends only part way up in the chamber 46 and actually terminates at a line coextensive with the desired liquid level of the liquid mixture to be separated within apparatus 10. It will also be noticed that floor 64 of apparatus 10 is sloped or pitched so that solid sediments heavier than the liquid mixture to be separated will accumulate by gravity in certain areas of the apparatus 10 to facilitate their periodic removal in a cleaning procedure. Partition 58 will be observed to include a slot or portal 66 placing chambers 52 and 54 in open communication with each other at the level coextensive with the liquid level in apparatus 10. In addition, there is a portal 68 piercing partition 50 at floor 64 level to provide open communication between the bottoms of chambers 46 and 52 (not seen in FIG. 3).

FIG. 4 is a view of the apparatus 10 as seen along lines 4—4 of FIG. 2 and shows in further detail duct or portal 70 at the desired liquid level within apparatus 10, piercing partition 34 and permitting communication between chambers 28 and 36. The portal 70 is located at a height along the desired upper level of liquid mixtures deposited in chamber 28 through the conduit 22. The partition 44 is pierced by portal 72 adjacent floor 64 permitting communication between the lower end of chamber 36, through conduit 74 and into chamber 46 at the upper liquid level of mixtures within apparatus 10.

The apparatus 10 functions to separate relatively light solid materials (for example fats and grease having a specific gravity lower than the specific gravity of water) deposited therein in the following manner. Liquid mixtures comprising relatively light solids and melted liquid forms thereof and relatively heavier liquids are carried from outside of the apparatus 10 through conduit 22 for release in the lower end of chamber 28. Vent 80 on conduit 22 facilitates flow of the mixture. The liquid portion of the mixture will generally include liquified forms of the solid materials to be separated such as liquified grease, fats and like materials, liquified by exposure to temperatures above their melting points. As seen in FIG. 5, baffle plate 30 is positioned adjacent the open end of conduit 22 and, as indicated by the arrows, directs the inflow of the liquid mixtures upward in chamber 28. The baffle plates 30, 32 function to separate materials within the deposited mixture having different specific gravities. As shown in FIG. 5, a view along lines 5—5 of FIG. 2, the initially separated mixture within chamber 28 is pushed toward the portion of chamber 28 distal to conduit 22. At a desired liquid mixture level selected within apparatus 22 there appears a portal 70 through partition 34 which provides communication between chambers 28 and 36. The lighter or less dense materials including liquified solid materials immediately pass through portal 70 and into the chamber 36. Heavier liquids will also pass through portal 70 as their level in chamber 28 approaches the height of portal 70. Heavier solid materials will deposit on floor 64 and will accumulate by the force of gravity adjacent partition 34 within chamber 28. These initially deposited solid materials may be removed periodically as required to maintain a flow of materials through the conduit 22.

Referring now to FIG. 6, a view along lines 6—6 of FIG. 2 one may see the interior of chamber 36 which preferably is of sufficient volume to allow the temperature responsive, liquified forms of solid materials to cool and solidify in the upper regions of chamber 36. Thus, grease and fats will solidify from an aqueous mixture at the top of the mixture. Since the partition 44 is closed with the exception of portal 72 at the base thereof, solidified, relatively light solid materials will accumulate in the chamber 36 while the heavier, more dense liquid materials will pass through portal 72 upward through duct 74 and into the chamber 46 (refer briefly to FIG. 4) free of the solids.

Referring now to FIG. 7, a view along lines 7—7 of FIG. 2, one can see that the chamber 46 permits continued flow of the passed, relatively heavy liquids through portal 68 at the base of chamber 46 into the chamber 52. The flow continues from chamber 52 (refer now to FIG. 8, a view along lines 8—8 of FIG. 2) in a circuitous manner through portal 66 at the top of chamber 52 into chamber 54 and thence through portal 76 at the base of partition 60 into chamber 56 as shown by the arrows in FIG. 8. From chamber 56 the relatively heavy fluid material, free of the relatively light solids will pass out of apparatus 10 through exit conduit 62, facilitated by vent 63 on conduit 62. The tortured route of the liquid mixtures through the apparatus 10 as described above accounts for a high degree of separation of the light solids such as solidified fats and greases. It is a highly efficient separation.

Returning now to FIG. 6, the removal of the solidified and relatively light solid materials from apparatus 10 will be explained. A skimmer 38 is pivotally hinged to the partition 42 so that it may sweep chamber 36 in an arc from bottom to top. To skim the liquid surface of liquids in chamber 36, one pulls upward on skimmer handle 24 (see FIG. 1) which is secured to skimmer 38, to rotate pivotally upward from the bottom of chamber 36, the skimmer 38 so that it picks up from the surface of liquids in chamber 36 the solidified, relatively light solids floating thereon. The skimmer 38 may be a screen, permitting liquid to drain back into chamber 36. The skimmed solid materials is deposited by gravity into the chamber 40 beneath access door 20. In a preferred embodiment of the invention, a removable container 78 is positioned within chamber 40 to receive the separated solid materials for ultimate removal from apparatus 10 for disposal. Thus, the solid materials are skimmed and separated from the liquid mixtures in chamber 36. The skimmer 38 component facilitates a sanitary, convenient and efficient means of physically removing the solids, such as fats, grease and the like, without having to open the access covers.

Those skilled in the art will appreciate that many modifications may be made to the above described preferred embodiments of the invention without departing from the spirit and scope of the invention. For example, one need not employ a removable container 78 but could instead manually remove, periodically, separated solid materials. Also, the sizes of the various chambers, portals and ducts can be modified over a wide range. Of course there are optimum sizes of chambers, particularly chamber 36 wherein the mixtures delivered will have sufficient residence time to allow liquid fats, greases and the like to solidify at lower temperatures. Those skilled in the art will appreciate, by trial and error techniques for given separatory situations, how to determine optimum chamber and portal dimensions.

What is claimed is:

1. An apparatus for gravity separating relatively light solids from heavier liquids, which comprises;
   an enclosure, open at the top;
   first partition means within said enclosure for defining a first chamber therein;
   a first conduit through the enclosure having a first open end outside of the enclosure and a second open end adjacent the bottom of the chamber, said conduit being a means of delivering mixtures of the heavy liquids with said solids and liquified forms of said solids, to the apparatus;
   baffle means adjacent the second open end of the conduit, for directing the flow of said mixtures upward in the chamber;
   second partition means within said enclosure for defining at least in part a second chamber within said enclosure;
   a portal in the upper part of the first partition means, opening between the top of the first chamber and the top of the second chamber;
   third partition means within the enclosure which with said second partition means defines a third chamber within the enclosure and alone defines at least in part a fourth chamber;
   second conduit means having a first open end in the bottom of the second chamber and a second open end in the top of the third chamber;
   fourth partition means dividing the fourth chamber into first and second zones;
   a portal in the bottom of the third partition means, opening between the bottom of the third chamber and the bottom of the first zone of the fourth chamber;
   fifth partition means dividing the second zone into said second zone and a third zone;
   a portal in the upper part of the fourth partition means opening between the first and second zones;
   a portal in the bottom of the fifth partition means opening between the second and third zones;
   outlet means in the upper portion of the third zone opening to the outside of the enclosure;
   means of covering the open top of the enclosure;
   means in the means of covering, for access to the first, second, third and fourth chambers; and
   means for skimming solids from said mixtures in the second chamber, which comprise a strainer pivotally mounted at one end on a wall of the second chamber and free to pivot about its mounting so the opposite end thereof may travel in an arc from the lower end of the second chamber to above said second chamber at an angle permitting skimmed solids to fall by gravity toward the mounted end.

* * * * *